No. 637,840. Patented Nov. 28, 1899.
W. M. WILKEY.
SOIL BREAKING MACHINE.
(Application filed June 17, 1898.)
(No Model.) 2 Sheets—Sheet 1.
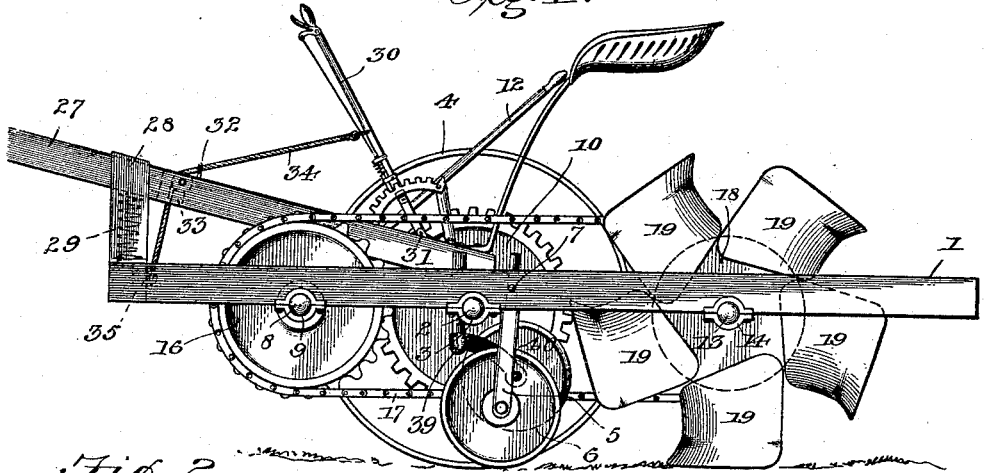
Fig. 1.
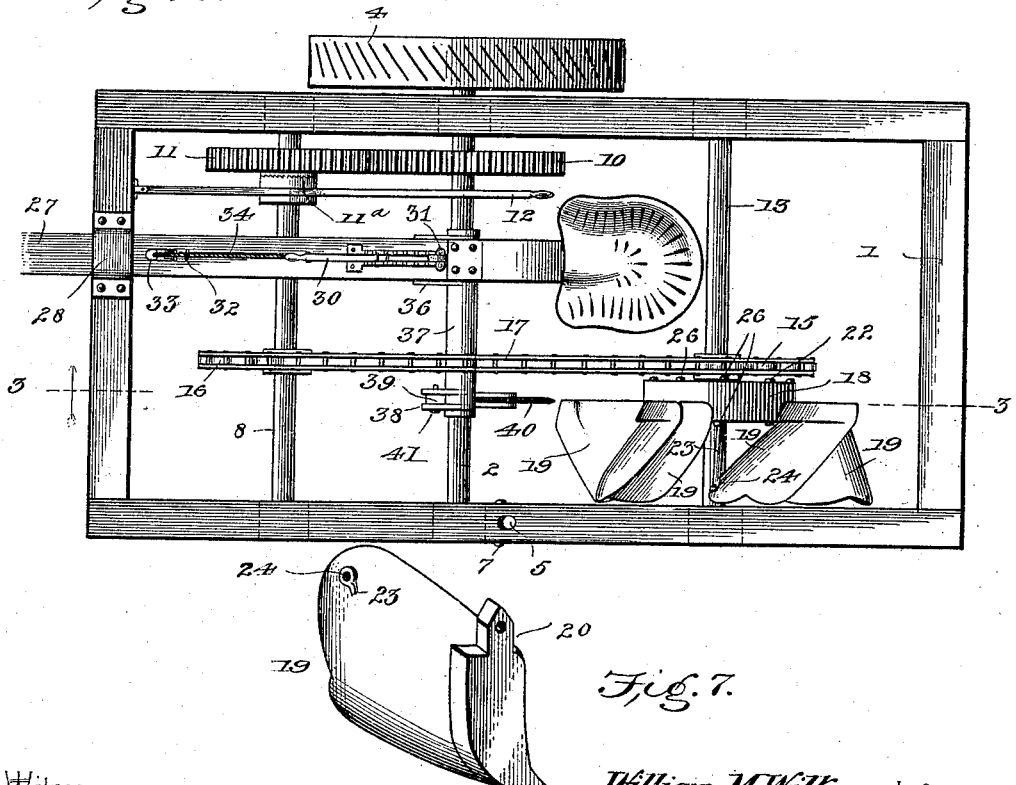
Fig. 2.
Fig. 7.
Witnesses
E. J. Monroe
H. F. Beinhard
William M. Wilkey Inventor
By his Attorneys,
C. A. Snow & Co.
THE NORRIS PETERS CO., PHOTO-LITHO., WASHINGTON, D. C.

No. 637,840. Patented Nov. 28, 1899.
W. M. WILKEY.
SOIL BREAKING MACHINE.
(Application filed June 17, 1898.)
(No Model.) 2 Sheets—Sheet 2.
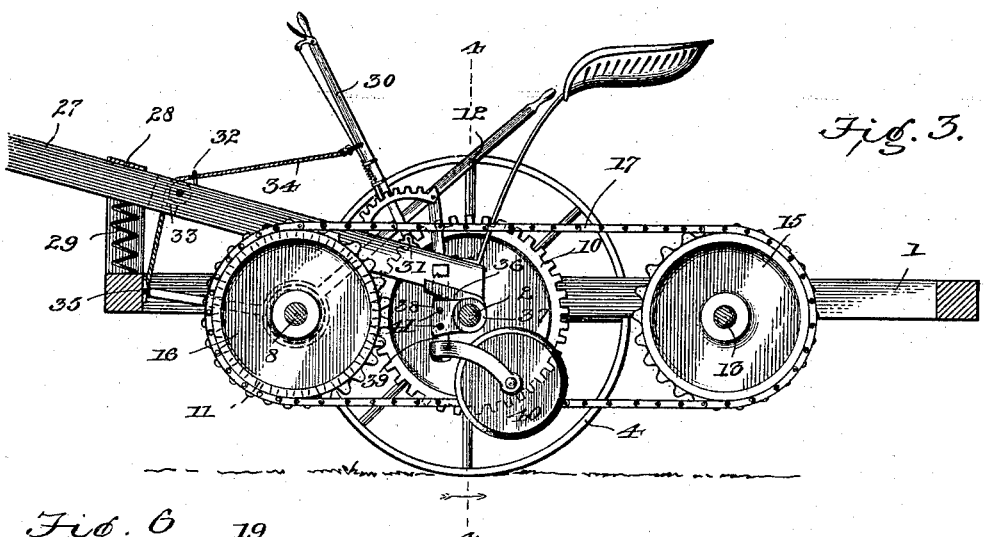
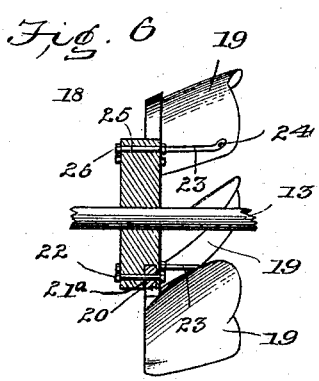
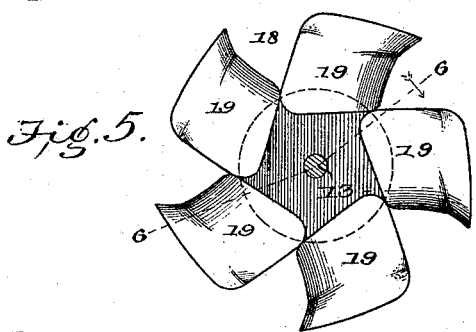
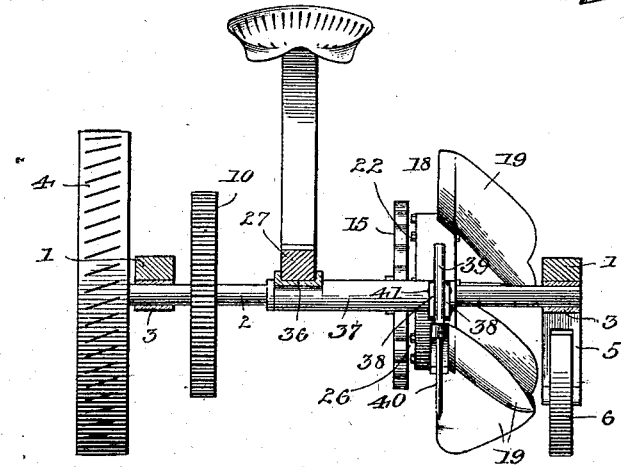
Witnesses
William M. Wilkey
Inventor
By his Attorneys,

UNITED STATES PATENT OFFICE.

WILLIAM M. WILKEY, OF YEDDO, INDIANA.

SOIL-BREAKING MACHINE.

SPECIFICATION forming part of Letters Patent No. 637,840, dated November 28, 1899.

Application filed June 17, 1898. Serial No. 683,721. (No model.)

*To all whom it may concern:*

Be it known that I, WILLIAM M. WILKEY, a citizen of the United States, residing at Yeddo, in the county of Fountain and State of Indiana, have invented a new and useful Soil-Breaking Machine, of which the following is a specification.

My invention relates to a machine for breaking ground; and it is designed to be used in lieu of the ordinary plow for the purpose of pulverizing the soil with a view to preparing it for planting seed therein without the necessity for harrowing the ground.

One object of the invention is to provide a structure of a simple nature which shall be efficient in operation to crush and break all the clods and reduce the soil to a pulverized condition, and said machine may be drawn across the field by a team to perform the work ordinarily required of three or more horses and their corresponding complement of drivers and implements.

A further object of the invention is to equip the machine with means by which the path of the breaker-wheel may be cleared of weeds and grass to avoid interference with the proper operation of said breaker-wheel.

A further object of the invention is to equip the machine with means by which the breaker-wheel may be thrown into and out of service and to improve the machine in minor details, so as to increase the efficiency and promote the durability thereof.

With these ends in view the invention consists in a novel construction of the breaker-wheel and in the construction, arrangement, and combination of parts, which will be hereinafter fully described and claimed.

To enable others to understand the invention, I have illustrated the preferred embodiment thereof in the accompanying drawings, forming a part of this specification, and in which—

Figure 1 is a side elevation of a soil-breaking machine constructed in accordance with my invention. Fig. 2 is a plan view thereof. Fig. 3 is a longitudinal sectional elevation on the plane indicated by the dotted line 3 3 of Fig. 2. Fig. 4 is a detail transverse sectional view on the plane indicated by the dotted line 4 4 of Fig. 3. Fig. 5 is a view in elevation of the breaker-wheel, and Fig. 6 is a cross-section through the breaker-wheel on the plane indicated by the dotted line 6 6 of Fig. 5. Fig. 7 is an enlarged detail view of one of the breaker blades or bits.

Like numerals of reference denote like and corresponding parts in each of the several figures of the drawings.

The frame 1 of my implement may be of any suitable construction, material, and dimensions. Transversely across this frame, at the middle thereof, is arranged a power-shaft 2, which is journaled in suitable bearings or cap-boxes 3, which are secured to the under side of the side rails of said frame. One end of this power-shaft is extended or prolonged beyond one side of the frame, and to this extended end of the shaft is rigidly secured in a suitable way the traction or ground wheel 4, which is preferably made of metal and is formed with a broad tread, having teeth on its surface to prevent it from sinking into or slipping on the ground. This wheel 4 is adapted to travel on solid or unbroken ground, while a caster-wheel rides in the furrow of the broken or plowed ground. To the other side of the carrying-frame 1, at the middle thereof, is arranged a hanger 5. This hanger depends a suitable distance from the frame and its lower end supports a horizontal shaft or axle for a metallic caster-wheel 6. The hanger is vertically adjustable on the frame, and for this purpose any suitable type of clamp may be used. In the drawings I have represented the hanger as constructed with a perforated stem or shank, which passes through a vertical aperture in one side rail of the frame at a point contiguous to the power-shaft 2, and through this perforated hanger-stem passes a removable bolt or pin 7, by which the hanger may be adjustably clamped to the frame. I would have it understood, however, that I do not confine myself to the detailed construction of the hanger nor to any special devices for attaching the hanger vertically to the frame, as it is evident that these details may be varied by a skilled mechanic without departing from the invention.

A counter-shaft 8 is arranged transversely of the main frame in advance of the power-shaft 2, and this counter-shaft is journaled in suitable bearings or cap-boxes 9, which are fastened to one side of said frame 1. The power-shaft 2 is driven by the traction-wheel 4, and the counter-shaft 8 is in turn driven by the power-shaft 2 through the intermeshing gears 10 and 11. The gear 10 is rigidly secured to the power-shaft 2 at a point near one side of and within the frame 1; but the driven pinion 11 is fitted on the counter-shaft 8, to be made fast therewith through the medium of a clutch 11ª. This clutch may be of any suitable construction preferred by the skilled constructor, and it is controlled by a shifting lever 12, which is operatively connected with the movable member of the clutch, whereby the driven pinion 11 may be moved into and out of engagement with the driving-gear 10.

The breaker-wheel shaft 13 is arranged across the machine in a plane parallel to the power-shaft and the counter-shaft; but it lies in rear of the power-shaft, and it is driven to rotate the breaker-wheel in a vertical plane and in a contrary or reverse direction to the ground-wheel. This shaft 13 is journaled in bearings or cap-boxes 14, which are rigidly secured to one side of the main frame 1, and to said shaft 18 is rigidly secured a sprocket-wheel 15, which is in alinement with a sprocket-wheel 16 on the counter-shaft 8. An endless sprocket-chain 17 connects the two sprocket-wheels 15 and 16 on the shafts 13 and 8, respectively, and thus the shaft 13 is driven from the counter-shaft, which in turn is rotated by the power-shaft 2, whereby the breaker-wheel 18 is rotated in a reverse direction to the ground-wheel 4. On this shaft 13 is rigidly secured the breaker-wheel 18, which carries a series of blades or bits 19, fashioned in the peculiar manner represented by Fig. 7 of the drawings. The breaker-wheel 18 is of metal or other suitable material, and it is fastened to the shaft 13 by a set-screw or key. This wheel or disk 18 is of a diameter proper to carry the desired number of bits or blades 19, and they are spaced at suitable intervals around the disk or wheel. Each blade or bit is made in a single piece of metal, and it is shaped to provide a convex face on the outer side and a concave face on the inner side of the blade. The heel 19ª of the blade is somewhat thicker and heavier than the working part of the blade itself, and this working section of the blade lies at an angle to the heel 19ª. The blade is provided with an angular shank 20, which is integral with the heel and extends outwardly therefrom, and the shank of each blade is snugly fitted in a socket 21ª, which is provided radially in the disk or wheel 18. The shank is secured firmly in the socketed part of the disk by a bolt 22, which passes transversely through the disk and the shank, and this bolt may be readily removed to permit the blade to be detached when it becomes worn or injured, thereby providing for the ready renewal of worn blades. The blades are peculiarly constructed for application to the rotary disk or wheel to project outwardly from one face or side of said wheel, and the blades lie in a generally-inclined direction to the face of the wheel, while their curved working faces are presented by the disk in its rotation to the ground to penetrate the latter at an angle and in a measure lift the ground and press the same. Each blade is braced by a rod 23, which is fastened to the working parts thereof, as by a bolt 24, and the threaded end 25 of each brace passes through an opening in the disk or wheel 18 to receive the nuts 26, which are screwed on the threaded length of the brace to bear against opposite faces or sides of the disk.

I attach importance to the breaker-wheel constructed with a plurality of curved blades which extend in inclined directions from one side of the disk to which they are attached, and these blades present large areas of working faces for the purpose of breaking up the clods and thoroughly pulverizing the soil.

The machine is equipped with a draft-tongue 27, which is shown as arranged in an approximately inclined position over the main frame 1 and between the intermeshing gears and the sprocket-wheel. This tongue passes through a keeper 28, which is securely fastened to the front rail of the frame, and the tongue is held in a raised position by a coiled spring 29, which is housed within the keeper and acts against the lower side of the tongue. The tongue may be depressed more or less to change the draft on the implement by a lever 30, which is fulcrumed, as at 31, on the tongue, and this tongue is perforated by a vertical aperture 33 at a point in rear of the keeper, and it is provided with a suitable guide 32, which is attached to the tongue near the perforation 33. A cord, chain, or cable 34 is carried through the guide 32 and the perforation 33, and one end of said cord or cable is fastened to the lever 30, while its other end is attached, as at 35, to the front rail of the frame. By operating the lever 30 in one direction the cord will be drawn upon to depress the tongue against the tension of the spring; but when the lever is released the spring acts to force the tongue in an upward direction within the limit permitted by the keeper. The rear end of the draft-tongue is rigidly fastened to a bracket 36 on a sleeve 37. This sleeve is fitted loosely on the central power-shaft 2 of the machine, and it is of a length to extend from the tongue to a point in line with the disk or wheel 18. At the free end of this sleeve 37 it is provided with an integral bracket or head 38, and in said head is fitted a stem or rod 39. The lower end of this stem or rod sustains a colter wheel or disk 40; but the upper end of the stem is attached to the bracket or head 39 by the bolts 41, which are arranged to permit the stem to be adjusted vertically in the bracket as well as to be moved to different inclined positions with relation to the bracket and sleeve. When the machine is drawn across the field, the traction-wheel operates to propel the shafts through the described gearing, so as to rotate the breaker-wheel in a vertical plane, and the curved blades or bits rotate with said breaker-wheel to crush any clods and thoroughly pulverize the soil. The colter or disk 40 clears the ground in advance of the breaker-wheel of any weeds or grass, so that the breaker-wheel will operate efficiently without hindrance from obstructing matter. The line of draft through the tongue may be changed by adjusting the lever 30, and the breaker-wheel may be thrown out of operation by adjustment of the clutch-controlling lever 12.

Although I have shown the breaker-wheel shaft and the driving and counter shafts applied to the lower side of the main frame, it is evident that this arrangement of the parts may be varied—as, for example, by placing the driving and counter shafts on the upper side of the frame and arranging the breaker-wheel shaft on the lower side of the frame.

It will also be understood that the dimensions of the carrying-frame and the proportions of the gearing and shafting may be varied within wide limits and as may be suggested by a skilled mechanic.

Slight changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. In a machine for pulverizing ground, a breaker-wheel consisting of a socketed disk, a series of curved blades extending in inclined directions outwardly from the disk and having shanks which are fitted in the sockets of the disk, the bolts to detachably secure the blade-shanks to the disk, and braces fastened to the free edges of the blades and attached to the disk, substantially as described.

2. In a machine for pulverizing ground, the combination with a frame, a breaker-wheel journaled therein and means for positively rotating the breaker-wheel, of a keeper fixed to the frame, a tongue loosely connected to one of the shafts and fastened to the keeper, a spring tending to normally raise the tongue, and a lever mounted on the tongue and operatively connected with the frame, substantially as described.

3. In a machine for pulverizing ground, the combination with a frame, a breaker-wheel, and gearing by which the breaker-wheel is positively rotated, of a tongue, a sleeve mounted on one of the machine-shafts and rigidly fastened to the tongue to serve as a means for loosely connecting the heel thereof to the machine, and a colter carried by said sleeve, substantially as described.

4. In a machine for pulverizing ground, the combination with a frame, a ground-wheel, and gearing between the ground-wheel and the breaker-wheel, of a sleeve loosely mounted on a shaft of one of the gears and provided at one end with a head, a tongue fastened to the sleeve, a colter, and a carrying-stem to which the colter is attached and clamped adjustably in the head of said sleeve, substantially as described.

5. In a machine for pulverizing ground, a revoluble breaker-wheel comprising a disk, a series of blades inclined laterally and downwardly from one face of the disk, and united at their inner ends firmly to said disk, and braces fastened to the inclined blades at the outer free ends of the latter and to said disk, substantially as described.

In testimony that I claim the foregoing as my own I have hereto affixed my signature in the presence of two witnesses.

WILLIAM M. WILKEY.

Witnesses:
AMOS G. LEONARD,
J. A. MEANS.